United States Patent [19]

Kakinuma et al.

[11] Patent Number: 5,093,727
[45] Date of Patent: Mar. 3, 1992

[54] IMAGE SENSOR HAVING PHOTODIODES OF IMPROVED RESPONSE TO LOW INTENSITY OPTICAL INPUT

[75] Inventors: Hiromi Kakinuma; Kazuyuki Hirooka, both of Takasaki, Japan

[73] Assignee: Taiyo Yuden Co., Ltd., Tokyo, Japan

[21] Appl. No.: 669,926

[22] Filed: Mar. 15, 1991

[30] Foreign Application Priority Data

Mar. 30, 1990 [JP] Japan .......................... 2-86729

[51] Int. Cl.$^5$ .......................... H04N 5/30; H04N 5/335
[52] U.S. Cl. .......................... 358/211; 358/209; 358/213.11; 250/208.1; 250/208.3
[58] Field of Search .................. 358/209, 211, 213.11, 358/230, 21 R; 250/208.1, 208.3, 211 J

[56] References Cited

U.S. PATENT DOCUMENTS

| | | | |
|---|---|---|---|
| 3,418,652 | 12/1968 | Brooks | 250/208.3 |
| 3,432,670 | 3/1969 | Dym | 250/208.3 |
| 3,448,275 | 6/1969 | Hall | 250/208.3 |
| 4,461,956 | 7/1984 | Hatanaka | 358/213.11 |
| 4,785,191 | 11/1988 | Ondris | 358/213.11 |
| 5,006,702 | 4/1991 | Kakinuma | 250/208.1 |

FOREIGN PATENT DOCUMENTS

WO90/1846  2/1990  PCT Int'l Appl. .

Primary Examiner—James J. Groody
Assistant Examiner—Sherrie Hsia
Attorney, Agent, or Firm—Woodcock Washburn Kurtz Mackiewicz & Norris

[57] ABSTRACT

A one dimensional image sensor is disclosed which has a series of photodiodes to be electrically scanned by voltages developed by a sawtooth voltage for generating electric outputs representative of incident optical energy. The scanning voltages for the photodiodes have so far risen beyond their predetermined saturation points with each ramp of the sawtooth voltage, deteriorating the image sensor response to low intensity optical input in particular. This weakness of the prior art is overcome by providing a bias source which generates a periodically varying bias voltage having a series of ramps that are opposite in the direction of progress to the ramps of the sawtooth voltage.

8 Claims, 5 Drawing Sheets

(A) Iout
(100 LUX)

(B) Iout
(10 LUX)

IMAGE SENSOR HAVING PHOTODIODES OF IMPROVED RESPONSE TO LOW INTENSITY OPTICAL INPUT

BACKGROUND OF THE INVENTION

Our invention relates to image sensors, and more particularly to an image sensor of the kind employing photodiodes as photoelectric converters to be electrically scanned sequentially for providing electric signals representative of optical energy incident thereon.

The image sensor has been known which comprises photoelectric converters for translating optical energy into electric energy, and analog switches for electrically "scanning" the photoelectric converters in order to cause the same to produce electric signals. Usually, the analog switches have taken the form of field effect transistors (FETs) disposed adjacent the photoelectric converters.

In an image sensor of this conventional type fabricated in the form of an integrated circuit, each FET has had to be sized to fit the width (e.g. 125 micrometers) of one photoelectric converter, that is, of one picture element. It has been no easy task to form such microminiaturized FETs. An additional difficulty has arisen as the three wiring conductors of minimal widths (e.g. 10 micrometers) for the drain, source and gate of each FET has had to be formed on prescribed parts of the baseplate. The image sensors of this type have therefore been very expensive because of the noted difficulties in manufacture.

Patent Cooperation Treaty International Publication No. WO 90/1846 represents a conventional solution to this problem. It teaches the use of a serial circuit of diodes for scanning photoelectric converters in the form of photodiodes. The resulting image sensor is far easier of manufacture as the required wiring conductors can each be as wide as 20 micrometers or so.

We have, however, found a weakness in this prior art image sensor. When the image sensor is supplied with a sawtooth voltage for scanning the photodiodes, the scanning voltages for the photodiodes have not saturate but continued to increase with time beyond the desired saturation points. Such excursions of the scanning voltages are undesirable as they deteriorate the response of the image sensor to optical input of low intensity (e.g. 10 lux) in particular. We will elaborate on this weakness of the prior art image sensor in the course of the detailed description of our invention.

SUMMARY OF THE INVENTION

We have hereby invented how to improve the response of the prior art image sensor of the type defined above, to optical input of small intensity. We have also discovered how to minimize fluctuations in the sensitivities of the individual photodiodes incorporated in this type of image sensor as photoelectric converters.

Briefly stated in its broadest aspect, our invention provides an image sensor of improved response to a low intensity optical input, comprising drive means for generating a sawtooth voltage, a first set of diodes interconnected in series to provide a series circuit connected to the drive means, each diode being so electrically oriented with respect to the drive means as to be forward biased by the sawtooth voltage, a first set of resistors connected respectively to the first set of diodes, a second set of diodes connected respectively to the first set of resistors and so electrically oriented with respect to the drive means as to be forward biased by the sawtooth voltage, a second set of resistors connected respectively between the first set of diodes and the drive means, a plurality of photodiodes connected respectively between the first set of resistors and a current output line and electrically so oriented with respect to the drive means as to be reverse biased by the sawtooth voltage, a plurality of blocking diodes connected respectively to the photodiodes in order to prevent their mutual interference, and a current to voltage converter circuit connected to the current output line. Characteristically, a bias source is connected to the second set of diodes for applying a periodic bias voltage in synchronism with the sawtooth voltage.

The bias voltage has a series of ramps opposite in the direction of progress to the ramps of the sawtooth voltage, so that voltages for scanning the photodiodes can be restrained from increasing with an increase in the sawtooth voltage beyond their saturation points determined by the second set of diodes. As the rises of the scanning voltages beyond their saturation points are thus totally prevented, or made less than heretofore, the photodiodes become correspondingly more sensitive to incident optical energy of low magnitude. Experiment has also proved that, a secondary advantage gained by the improved image sensor of our invention, the photodiodes more constant in sensitivity than those of the noted prior art.

The above and other features and advantages of our invention and the manner of realizing them will become more apparent, and the invention itself will best be understood, from a study of the following description and appended claims, with reference had to the attached drawings showing some preferred embodiments of our invention.

DESCRIPTION OF THE PREFERRED EMBODIMENTS

Figure 1:
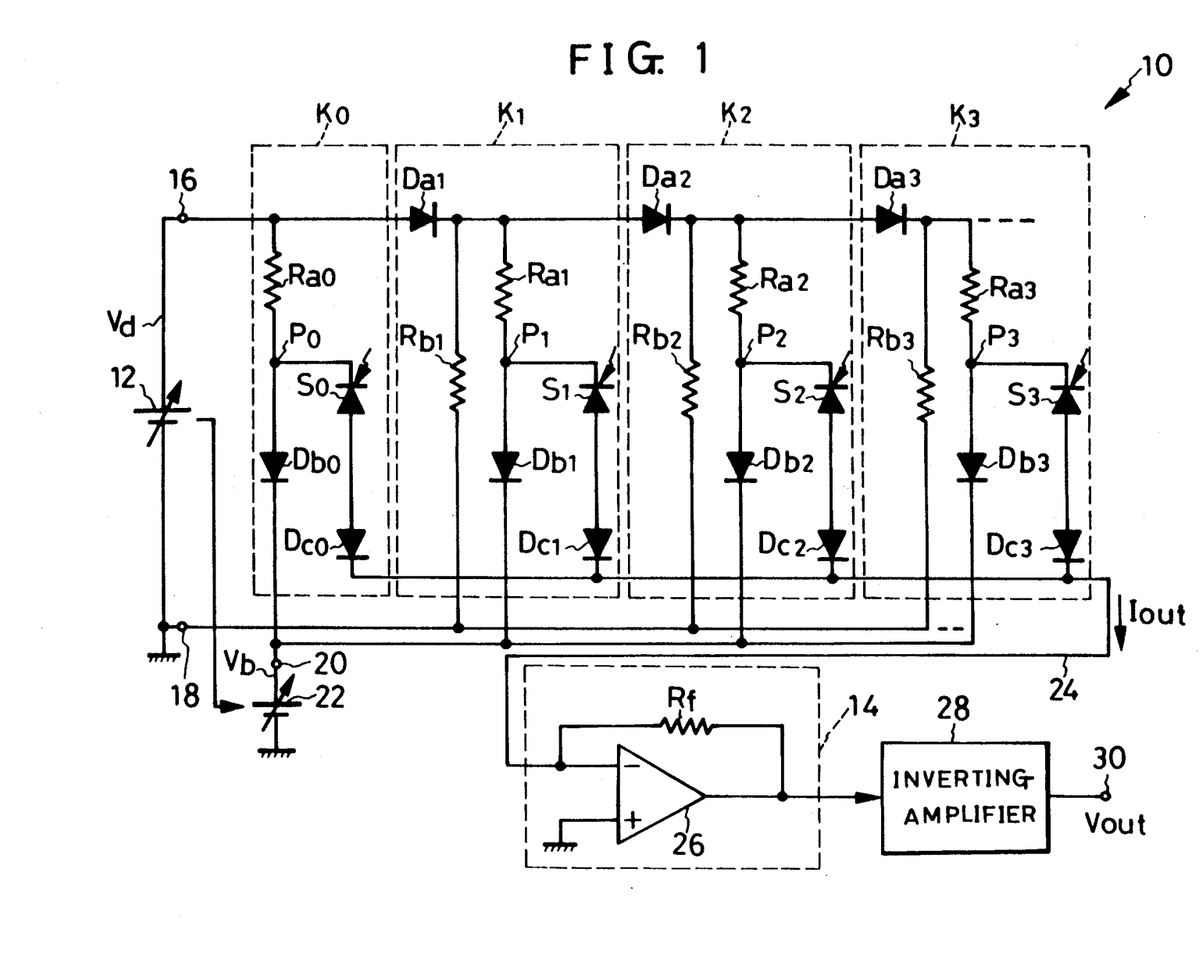
FIG. 1 is a schematic electrical diagram of the image sensor constructed in accordance with our invention.

Although the one-dimensional image sensor 10 shown in FIG. 1 by way of a representative embodiment of our invention is highly simplified for the ease of understanding, it will nevertheless be understood that the image sensor comprises a sawtooth drive voltage source 12, four photoelectric unit circuits $K_0$, $K_1$, $K_2$ and $K_3$ corresponding to as many picture elements or bits, and a current-to-voltage converter (CVC) circuit 14. Of course, a much greater number of such photoelectric unit circuits may be employed in practice for as many picture elements. We have shown the four units circuits $K_0$–$K_3$ here in order to illustrate our invention in as simple a form as possible.

All but the first $K_0$ of the four photoelectric unit circuits $K_0$–$K_3$ are of like construction, each comprising a photoelectric converter in the form of a photodiode $S_1$, $S_2$ or $S_3$, a first diode $Da_1$, $Da_2$ or $Da_3$, a second diode $Db_1$, $Db_2$ or $Db_3$, a first resistor $Ra_1$, $Ra_2$ or $Ra_3$, a second resistor $Rb_1$, $Rb_2$ or $Rb_3$, and a blocking diode $Dc_1$, $Dc_2$ or $Dc_3$. We understand that the photodiodes $S_0$–$S_3$ are physically aligned as this image sensor 10 is one dimensional as aforesaid.

The first stage unit circuit $K_0$, which is shown connected between sawtooth voltage source 12 and unit circuit $K_1$, comprises a diode $Db_0$, a resistor $Ra_0$, a photodiode $S_0$, and a blocking diode $Dc_0$. Thus the first stage unit circuit $K_0$ does not have parts corresponding to the first diodes $Da_1$–$Da_3$ and to the second resistors $Rb_1$–$Rb_3$ of the other unit circuits $K_1$–$K_3$. However, the unit circuit $K_0$ could also be constructed to include these parts; in short, the image sensor 10 could dispense with the unit circuit $K_0$ of the FIG. 1 construction.

The first diodes $Da_1$–$Da_3$ of the unit circuits $K_1$–$K_3$ are serially interconnected a positive terminal 16 of the sawtooth drive voltage source 12. These diodes $Da_1$–$Da_3$ are so oriented as to be forward biased by the voltage source 12; that is, the anodes of these diodes are connected to the voltage source. Incidentally, the cathodes of the diodes $Da_1$–$Da_3$ could be connected to a negative terminal of the voltage source 12.

Connected to the cathodes of the first diodes $Da_1$–$Da_3$, on the other hand, are the serial circuits of the first resistors $Ra_1$–$Ra_3$ and the second diodes $Db_1$–$Db_3$, respectively. In the first stage unit circuit $K_0$ a serial circuit of the first resistor $Ra_0$ and the second diode $Db_0$ is connected between the positive terminal 16 and grounded terminal 18 of the voltage source 12. The second diodes $Db_0$–$Db_3$ are so oriented as to be forward biased by the sawtooth voltage from the source 12. More specifically, the anode of the second diode $Db_0$ of the first stage unit circuit $K_0$ is connected to the positive terminal 16 of the voltage source 12 via the resistor $Ra_0$ whereas the anodes of the second diodes $Db_1$–$Db_3$ of the other unit circuits $K_1$–$K_3$ are connected to the cathodes of the first diodes $Da_1$–$Da_3$ via the resistors $Ra_1$–$Ra_3$.

The cathodes of the second diodes $Db_0$–$Db_3$ are all connected to a common bias terminal 20. A variable bias voltage source 22, which constitutes a feature of our present invention, is connected between the bias terminal 20 and the ground. The bias source 22 is to give a periodic, positive bias voltage synchronized with that of the sawtooth voltage from its source 12.

The second resistors $Rb_1$–$Rb_3$ of the three unit circuits $K_1$–$K_3$ are connected respectively between the cathodes of the first diodes $Da_1$–$Da_3$ and the ground.

The photodiodes $S_0$–$S_3$ of all the unit circuits $K_0$–$K_3$ are connected in series with the blocking diodes $Dc_0$–$Dc_3$, respectively. Further these serial circuits of photodiodes $S_0$–$S_3$ and blocking diodes $Dc_0$–$Dc_3$ are connected to the interconnections $P_0$, $P_1$, $P_2$ and $P_3$ between first resistors $Ra_0$–$Ra_3$ and second diodes $Db_0$–$Db_3$, respectively. More specifically, the cathodes of the photodiodes $S_0$–$S_3$ are connected to the interconnections $P_0$–$P_3$, and their anodes are connected to a common current output line 24 via the blocking diodes $Dc_0$–$Dc_3$ which are intended to prevent the photodiodes from mutual interference.

The CVC circuit 14 is shown as a combination of an operational amplifier 26 and a feedback resistor $R_f$. The operational amplifier 26 has its inverting input connected to the common current output line 24, and its noninverting input to the ground. The feedback resistor Rf is connected between the output and inverting input of the operational amplifier 26. The output of the operational amplifier 26, or of the CVC circuit 14, is connected to an inverting amplifier 28 and thence to the output terminal 30 of this image sensor 10.

It will be further noted from FIG. 1 that all the photodiodes $S_0$–$S_3$ are connected substantially in parallel with the second diodes $Db0$–$Db3$, respectively. Also, the photodiodes $S_0$–$S_3$ are so oriented as to be reverse biased by the sawtooth voltage from the source 12.

Figure 2:
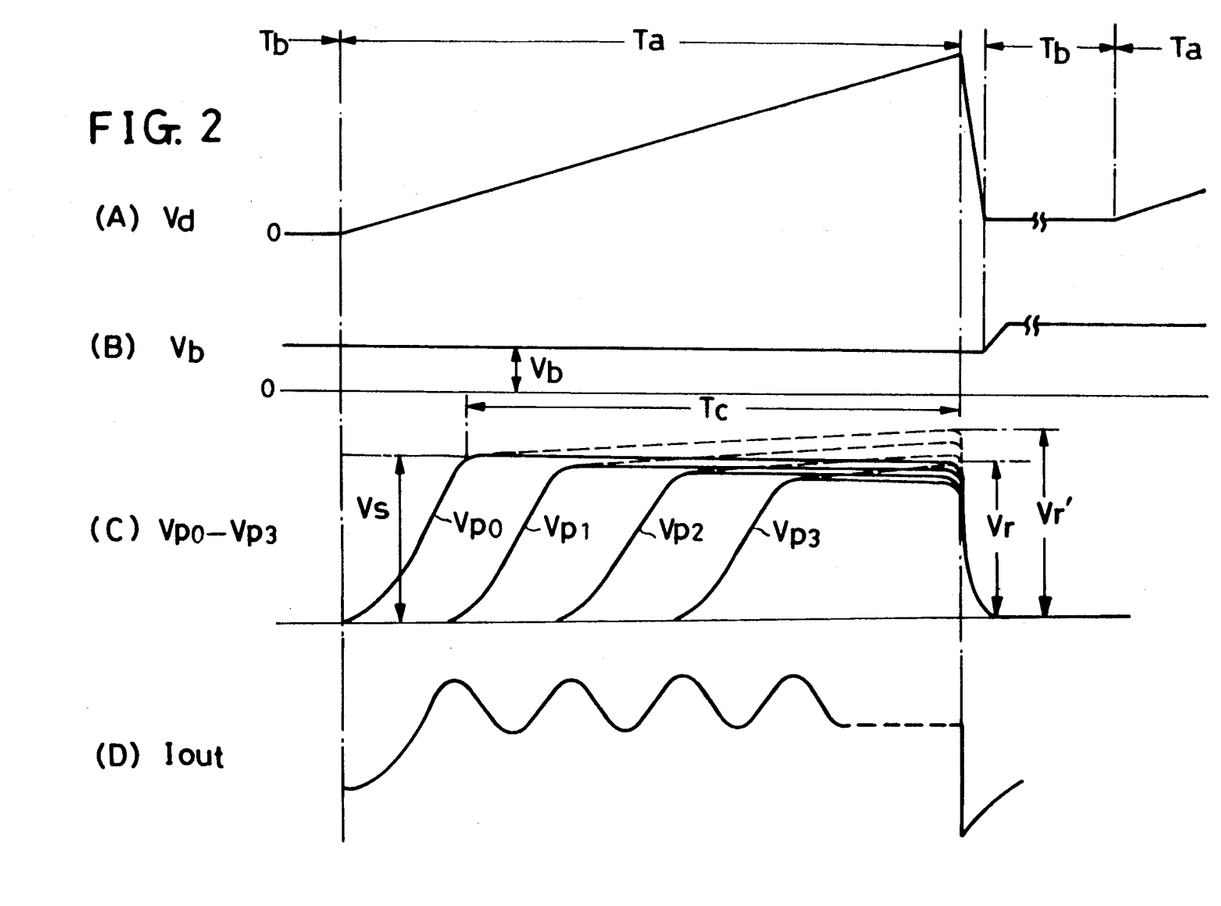
FIG. 2, consisting of (A)–(D), is a series of diagrams showing the waveforms appearing in the various parts of the FIG. 1 image sensor in timed relationship to one another.

We will now proceed to the more detailed discussion of the preferred constructions of some pertinent components of the image sensor 10. The voltage source 12 is constructed to generate the sawtooth sweep signal diagramed in FIG. 2(A). The peak amplitude of this sawtooth wave may be so determined as to cause conduction through all of the first and second diodes $Da_0$–$Da_3$ and $Db_0$–$Db_3$ included in this image sensor 10.

The photodiodes $S_0$–$S_3$, the first diodes $D_{a1}$–$D_{a2}$, the second diodes $D_{b0}$–$D_{b3}$ and the blocking diodes $D_{c0}$–$D_{c3}$ can all be of the pin junction type, each having a hydrogenated amorphous silicon semiconductor layer sandwiched between a pair of electrode layers. All such pin junction diodes may be mounted on a common baseplate.

Figure 4:
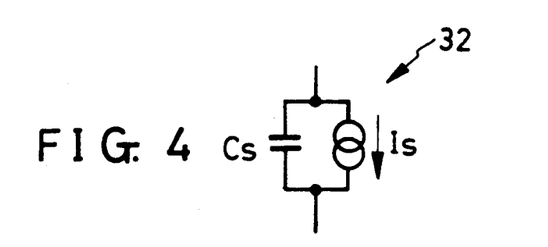
FIG. 4 is an equivalent circuit diagram of each photodiode in the FIG. 1 image sensor.

Since the photodiodes $S_0$–$S_3$ are reverse biased, each can be equivalently shown as a parallel circuit 32, FIG. 4, of capacitance $C_s$ and a source $I_s$ of current proportional to input light intensity. The current flowing through the equivalent capacitances $C_s$ of the photodiodes $S_0$–$S_3$ are of extremely small magnitude.

The voltages across the first diodes $D_{a1}$–$D_{a3}$ and the second diodes $D_{b0}$–$D_{b3}$ when they are conductive, that is, their forward voltages $V_f$, may be approximately 0.8 volt. The resistances of the first resistors $R_{a0}$–$R_{a3}$ may each be 100 kilohms, and those of the second resistors $R_{b1}$–$R_{b3}$ may each be one kilohm. All these resistors may be fabricated from $TiO_2$, Ta—$SiO_2$, or NiCr.

The variable bias source 22 generates a periodic bias voltage Vb, FIG. 2(B), with the same cycle with that of the sawtooth sweep voltage $V_d$, FIG. 2(A). It will be also noted from FIGS. 2(A) and 2(B) that the bias voltage $V_b$ has a series of ramps which are opposite in the direction of progress to those of the sawtooth voltage $V_d$; that is, the bias voltage $V_b$ linearly decreases with time during a time interval $T_a$ whereas the sawtooth voltage $V_d$ increases during the same time interval. The bias voltage $V_d$ may be so determined as to prevent potential increases in the saturation regions of the potentials $V_{p0}$–$V_{p3}$ at the circuit points $P_0$–$P_3$, FIG. 1, as represented in FIG. 2(C) in which the scale on the vertical axis is shown exaggerated in comparison with that of FIG. 2(A). The peak amplitude of the bias voltage $V_b$ is therefore less than that of the sawtooth voltage $V_d$.

OPERATION

Let us suppose that the drive voltage source 12 generates the sawtooth voltage of FIG. 2(A) in the image sensor 10 of the foregoing construction. The potential $V_{p0}$ at the circuit point $P_0$ of the first stage unit circuit $K_0$ will gradually increase as shown in FIG. 2(C). The second diode $D_{b0}$ of the unit circuit $K_0$ will become conductive when the difference $(V_{p0}-V_b)$ between potential $V_{p0}$ and bias voltage $V_b$ equals the forward voltage $V_f$ of the second diode $D_{b0}$, so that the potential $V_{p0}$ will approximately level off. The amplitude of the sawtooth wave is shown on a reduced scale in FIG. 2(A).

The first diode $D_{a1}$ of the second stage unit circuit $K_1$ will conductive approximately concurrently with the conduction of the second diode $D_{b0}$ of the first stage unit circuit $K_0$. The cathode potential of the first diode $D_{a1}$ of the second stage unit circuit $K_1$ will be approximately zero when that diode is nonconductive, and will increase in step with the sawtooth voltage $V_d$ as the sawtooth voltage increases following the conduction of the first diode $D_{a1}$. The voltage across the first diode $D_{a1}$ will be fixed at the forward voltage $V_f$ upon its conduction, so that the sawtooth voltage $V_d$ minus the forward voltage $V_f$ of the first diode $D_{a1}$ will be applied across the second resistor $R_{b1}$.

The potential at the point $P_1$ of the second stage unit circuit $K_1$ will approximately equal the voltage across the second resistor $R_{b1}$ when the second diode $D_{b1}$ of that unit circuit is nonconductive. Consequently, the potential $V_{p1}$ at the circuit point $P_1$ will gradually rise, as shown in FIG. 2(C), following the conduction of the first diode $D_{a1}$. The second diode $D_{b1}$ will become conductive when the potential $V_{p1}$ at the circuit point $P_1$ minus the bias voltage $V_b$ equals the forward voltage $V_f$ of the second diode $D_{b1}$. Then the potential $V_{p1}$ of the circuit point $P_1$ will become nearly constant.

The first diode $D_{a2}$ of the third stage unit circuit $K_2$ will become conductive approximately concurrently with the conduction of the second diode $D_{b1}$ of the second stage unit circuit $K_1$. Then the potential $V_{p2}$ will develop as shown in FIG. 2(C) at the circuit point $P_2$.

With a continued increase in the sawtooth voltage from the source 12, the first diode $D_{a3}$ of the fourth stage unit circuit $K_3$ will become conductive. Then the potential $V_{p3}$ will develop as shown in FIG. 2(C) at the circuit point $P_3$.

Being connected between the circuit points $P_0$–$P_3$ and the ground, the photodiodes $S_0$–$S_3$ will be driven sequentially, that is, electrically scanned, as the potentials $V_{p0}$–$V_{p3}$ at these circuit points successively build up as diagramed in FIG. 2(C).

The image sensor 10 with the row of photodiodes $S_0$–$S_3$ may be put to the reading of a facsimile copy or the like. To this end the sawtooth voltage of FIG. 2(A) may be applied from its source 12 to the terminal 16 while the desired optical information is being input to the photodiodes $S_0$–$S_3$.

As indicated in FIG. 2(A), each cycle of the sawtooth voltage is composed primarily of a period $T_a$ in which the voltage rises linearly with time, and a period $T_b$ in which the voltage remains zero. The length of the ramp voltage period $T_a$ may be $N \times 2.5$ microseconds, where N is the number of the first diodes $D_{a1}$, $D_{a2}$, $D_{a3}$, . . . included in the image sensor. Thus, if the image sensor has ten such diodes, the ramp voltage period $T_a$ may be 25 microseconds. The length of the zero voltage period $T_b$ should be much longer, five milliseconds for example.

As has been stated, the peak value of the sawtooth voltage $V_d$ is so determined as to cause simultaneous conduction through all of the first diodes $D_{a0}$–$D_{a3}$ and the second diodes $D_{b0}$–$D_{b3}$. For this reason the drive voltage will be impressed to all the photodiodes $S_0$–$S_3$ toward the end of each ramp voltage period $T_a$, with the consequent charging of their equivalent capacitances $C_s$. The image sensor 10 may be considered to be initialized or reset when the equivalent capacitances $C_s$ of all the photodiodes $S_0$–$S_3$ have been charged as above.

After having been fully charged by the end of each ramp voltage period $T_a$, the equivalent capacitances $C_s$ of the photodiodes $S_0$–$S_3$ will be discharged during the subsequent zero voltage period $T_b$, which is much longer than the ramp voltage period $T_a$. The degree of discharge will differ from one photodiode to another depending upon the intensity of the optical information input to each photodiode during the zero voltage age period $T_b$. Of course, no discharge will take place from any photodiode whose optical input is of zero intensity.

The optical information may be input to the photodiodes $S_0$–$S_3$ during other than the zero voltage periods $T_b$ of the sawtooth voltage $V_d$. However, the periods other than the zero voltage periods $T_b$ are so much shorter that variations in charges on the photodiodes $S_0$–$S_3$ during such periods are negligibly small for the purposes of our invention.

The potentials $V_{p0}$–$V_{p3}$ will develop at the circuit points $P_0$–$P_3$ as shown in FIG. 2(C) with the linear increase in the sawtooth voltage $V_d$ during each ramp period $T_a$. The photodiodes $S_0$–$S_3$ will be sequentially reverse biased by such potentials. In other words, the voltages for charging the equivalent capacitances $C_s$ of the photodiodes $S_0$–$S_3$ will be impressed to these photodiodes. At this time the charging current will flow through those of the photodiodes $S_0$–$S_3$ whose equivalent capacitances $C_s$ have been discharged in the presence of optical input, but not through the other photodiodes whose equivalent capacitances have not been discharged in the absence of optical input. The charging currents for the equivalent capacitances $C_s$ of all the photodiodes $S_0$–$S_3$ will flow through the respective blocking diodes $D_{c0}$–$D_{c3}$ and the common CVC circuit 14, resulting in variations in the output voltage $V_{out}$ obtained at the output terminal 30.

Let us suppose that all the photodiodes $S_0$–$S_3$ have received optical inputs of a given intensity, with the result that their equivalent capacitances $C_s$ have all been discharged. Then, with the sequential application of the FIG. 2(C) potentials $V_{p0}$–$V_{p3}$ to the photodiodes $S_0$–$S_3$, the output voltage $V_{out}$ will vary periodically as in FIG. 2(D) with the charging of the photodiodes. The charging current for each photodiode will increase with an increase in the potential at the corresponding one of the circuit points $P_0$–$P_3$ and start decreasing when the potential nearly saturates. The output voltage $V_{out}$ will vary in accordance with such change in the charging current. The current variations of FIG. 2(D) will not take place in cases where any one or more of the photodiodes $S_0$–$S_3$ have received no optical input.

We have so far explained the operation of the image sensor 10 on the assumption that the potentials $V_{p0}$–$V_{p3}$ at the circuit points $P_0$–$P_3$ saturate at practically constant values, as represented by the solid lines in FIG. 2(C). However, the potentials $V_{p0}$–$V_{p3}$ would not completely saturate but would continue rising with time, as indicated by the broken lines in FIG. 2(C), if the common bias terminal 20 were grounded, as has been the case heretofore, instead of being connected to the variable bias source 22, as taught by our invention. Such continued rises of the potentials $V_{p0}$–$V_{p3}$ would occur as a result of voltage drops at the second diodes $D_{b0}$–$D_{b3}$ caused by increased current flow therethrough with an increase in the sawtooth voltage $V_d$.

Take the potential $V_{p0}$ at the first stage circuit point $P_0$ for example. If the common bias terminal 20 were grounded, a difference would be created between the potential $V_s$ at the starting moment of saturation and the potential $V_r'$ at the end of the ramp period $T_a$ of the sawtooth voltage $V_d$. This difference would become greater with an increase in the length of time $T_c$ from the starting moment of saturation to the end of the ramp period $T_a$ of the sawtooth voltage $V_d$.

The charge voltage for the equivalent capacitance $C_s$ of the first stage photodiode $S_0$ varies with the potential $V_{p0}$ at the circuit point $P_0$. Therefore, should the potential $V_{p0}$ increase as indicated by the broken line in FIG. 2(C), the charge voltage for the equivalent capacitance $C_s$ of the photodiode $S_0$ would vary correspondingly, eventually rising to $V_r'$. This charge voltage $V_r'$ would be higher than the value $V_s$ of the potential $V_{p0}$ at the start of its saturation period $T_c$. Also, the charge voltage $V_r'$ would be the initial value of the zero voltage period $T_b$ of the sawtooth voltage $V_d$ in which the equivalent capacitance $C_s$ was to be discharged by the optical input to the photodiode $S_0$. However, if the optical input to the photodiode $S_0$ was of extremely low intensity during the zero voltage period $T_b$, the resulting increase in the charge voltage for the equivalent capacitance $C_s$ might be so small at the end of the zero voltage period $T_b$ that the voltage of the equivalent capacitance $C_s$ might not become lower than the potential $V_s$ at the start of the saturation period $T_c$.

For the above reason, even at the start of the ramp period $T_a$ of the sawtooth voltage $V_d$, the voltage of the equivalent capacitance $C_s$ might be higher than the potential $V_s$ at the start of the saturation period $T_c$. Then no charge current would flow into the equivalent capacitance $C_s$ even if the potential $V_{p0}$ at the circuit point $P_0$ rose as shown in FIG. 2(C). Thus the photodiode $S_0$ would be incapable of sensing optical input of extremely low intensity. The voltage of the equivalent capacitance $C_s$ of the photodiode $S_0$ at the end of each ramp voltage period $T_a$ must therefore be less than the potential $V_s$ at the start of each saturation period $T_c$. The same holds true with each of the other photodiodes $S_1$–$S_3$ included in the image sensor.

The prior art image sensor, not having the variable bias source 22, has another shortcoming, namely, the unequal responses of the individual photodiodes to optical inputs, especially when the inputs are of low intensity.

Figure 3:
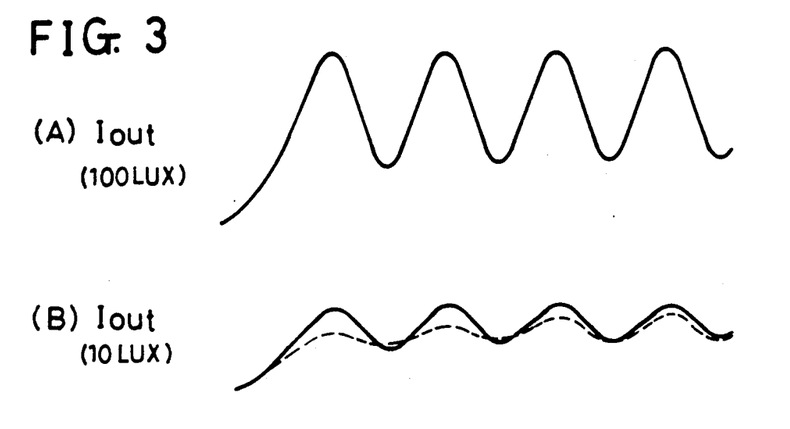
FIG. 3, consisting of (A) and (B), is a series of diagrams showing the current output waveforms of the FIG. 1 image sensor when the incident optical energy is of high intensity (A) and low intensity (B)

We have shown at (A) and (B) in FIG. 3 the waveshapes of the output current $I_{out}$ (i.e. input current to the CVC circuit 14) when the photodiodes $S_0$–$S_3$ are irradiated with optical inputs of 100 lux (high intensity) and 10 lux (low intensity). No appreciable difference arises in the output current when the photodiodes $S_0$–$S_3$ are subjected to the high intensity illumination regardless of whether or not the image sensor is provided with the variable bias source 22 according to our invention. A significant difference does, however, arise according to the presence or absence of the variable bias source 22 when the photodiodes $S_0$–$S_3$ are irradiated with the low intensity optical inputs.

The solid line in FIG. 3(B) represents the response of the image sensor 10 according to our invention to the low intensity optical information. The broken line in the same diagram represents the response of the prior art image sensor, not having the variable bias source 22, to the low intensity optical information. It will be observed that the individual photodiodes of the prior art image sensor respond unequally to the optical inputs of the same low intensity.

We ascribe the unequal responses of the photodiodes of the prior art image sensor to the different saturation periods of the second diodes $D_{b0}$–$D_{b3}$. As will be understood from FIG. 2(C), were it not for the variable voltage source 22, the saturation periods of the second diodes would become progressively shorter in the order of $D_{b0}$, $D_{b1}$, $D_{b2}$ and $D_{b3}$. Consequently, the differences between the values $V_s$ and $V_r'$ at the beginnings and ends of the saturation periods of the potentials $V_{p0}$–$V_{p3}$ at the circuit points $P_0$–$P_3$ would become progressively smaller in the order of $V_{p0}$, $V_{p1}$, $V_{p2}$ and $V_{p3}$. For this reason the photodiodes of the prior art image sensor have become progressively better in sensitivity in the order of $S_0$, $S_1$, $S_2$ and $S_3$.

We have overcome this drawback of the prior art by providing the variable bias source 22. This variable bias source generates the bias voltage $V_b$ which linearly decreases with time as shown in FIG. 2(B). The sums of the bias voltage $V_b$ and the voltages across the second diodes $D_{b0}$–$D_{b3}$. The voltages across the second diodes $D_{b0}$–$D_{b3}$ are opposite in polarity to the bias voltage $V_b$, so that the potentials $V_{p0}$–$V_{p3}$, at the circuit points $P_0$–$P_3$ are equal to the voltages across the second diodes $D_{b0}$–$D_{b3}$ minus the bias voltage $V_b$. Although the voltages across the second diodes $D_{b0}$–$D_{b3}$ increase with an increase in the sawtooth voltage from the source 12, such increases are canceled out by the bias voltage $V_b$. It is thus possible to restrict the undesired rises of the potentials $V_{p0}$–$V_{p3}$, that is, the voltages impressed to the photodiodes $S_0$–$S_3$, during their saturation periods, as indicated by the solid lines in FIG. 2(C).

Consider the first stage circuit point $P_0$ for example. The potential $V_r$ at this point at the end of each saturation period $T_c$ is only slightly less than the potential $V_s$ at its beginning. The fact that the potential $V_r$ is approximately equal to the potential $V_s$ is tantamount to the fact that the charge voltage for the equivalent capacitance $C_s$ of the photodiode $S_0$ at the beginning of the zero period $T_b$ of the sawtooth voltage $V_d$ is also approximately equal to the potential $V_s$. Thus the voltage of the equivalent capacitance $C_s$ of the photodiode $S_0$ will become less than the potential $V_s$ even if the optical input to the photodiode during the zero period $T_b$ of the sawtooth voltage $V_d$ is of low intensity.

Consequently, with the potential $V_{p0}$ developing at the circuit point $P_0$ during the ramp period $T_a$ of the sawtooth voltage $V_d$ as depicted in FIG. 2(C), a charge current will flow into the equivalent capacitance $C_s$ to provide the output current $I_{out}$. The photodiode $S_0$, as well as all the other photodiodes $S_1$–$S_3$ of the improved image sensor 10 according to our invention, will thus respond properly to an optical input of low intensity.

An inspection of FIG. 2 will also reveal that the periods of time during which the bias voltage $V_b$ acts effectively on the second diodes $D_{b0}$–$D_{b3}$ become progressively shorter in the order of $D_{b0}$, $D_{b1}$, $D_{b2}$ and $D_{b3}$. The periods of conduction of the second diodes $D_{b0}-D_{b3}$ during the ramp period $T_a$ of the sawtooth voltage $V_d$ also become progressively shorter in the same order. It will therefore be appreciated that the bias voltage $V_b$ can ideally cancel undesired rises of the saturation voltages of the second diodes $D_{b0}-D_{b3}$, thereby eliminating fluctuations in the sensitivity of the individual photodiodes $S_0-S_3$.

SECOND FORM

Figure 5:
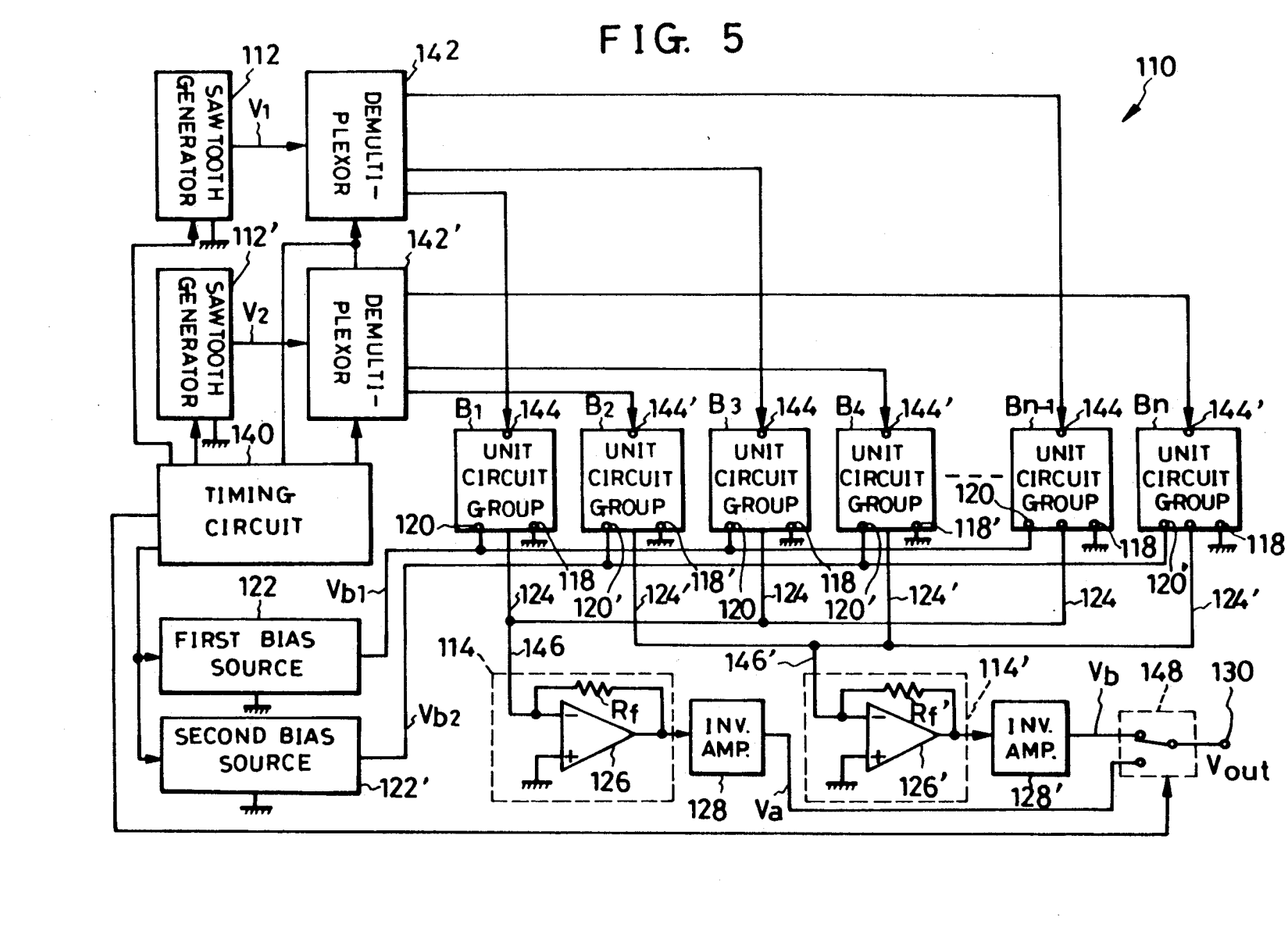
FIG. 5 is a schematic electrical diagram of another preferred form of image sensor in accordance with our invention.

We have illustrated in FIG. 5 a more practical form of image sensor 110 according to our invention which is suitable for use with facsimile. The image sensor 110 comprises a plurality or multiplicity of groups of photoelectric unit circuits $B_1-B_n$ of the same construction as the unit circuits $K_0-K_3$ of the FIG. 1 image sensor 10. In use of the FIG. 5 system as a one dimensional image sensor there may be provided as many as 2000 photodiodes in a row. These photodiodes may be divided into from several to several hundreds groups.

Two sawtooth generator circuits 112 and 112' are provided for driving the unit circuit groups $B_1-B_n$. Under the control of a timing circuit 140 the sawtooth generator circuits 112 and 112' generates respectively the sawtooth voltages $V_1$ and $V_2$ shown at (A) and (B) in FIG. 6.

Figure 6:
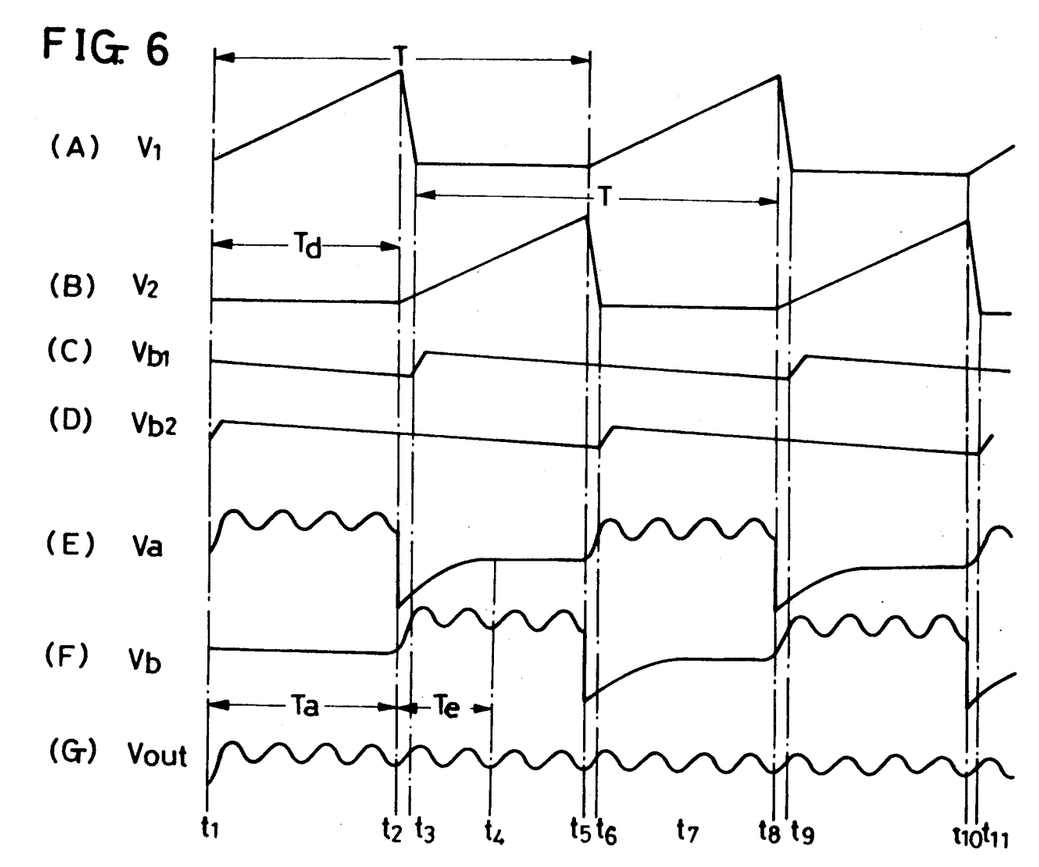
FIG. 6, consisting of (A)–(G), is a series of diagrams showing the waveforms appearing in the various parts of the FIG. 5 image sensor in timed relationship to one another.

As will be noted from FIG. 6(A), each cycle T of the sawtooth voltage $V_1$ generated by the first sawtooth generator circuit 112 is composed of a ramp period $t_1-t_2$, a brief return period $t_2-t_3$, and a zero period $t_3-t_5$. Thus, in short, the first sawtooth generator circuit 112 generates a series of triangular pulses, another pulse being generated between $t_5-t_9$.

The sawtooth voltage $V_2$ generated by the second sawtooth generator circuit 112' is also comprised of a similar series of triangular pulses, but with a phase lag $T_d$ from the first sawtooth voltage $V_1$. More specifically, in this particular embodiment, the ramp periods $t_2-t_5$ and $t_8-t_{10}$ of the second sawtooth voltage $V_2$ start at the ends of, and end at the beginnings of, the ramp periods $t_1-t_2$ and $t_5-t_8$ of the first sawtooth voltage $V_1$.

With reference back to FIG. 5 the first sawtooth generator circuit 112 is connected via a first demultiplexor 142 to the supply terminals 144 of the odd numbered ones $B_1, B_3, \ldots B_{n-1}$ of the unit circuit groups $B_1-B_n$. The timing circuit 140, also connected to the first demultiplexor 142, causes the same to deliver one cycle $t_1-t_5$ of the first sawtooth voltage $V_1$ to the first unit circuit group $B_1$, the next cycle $t_5-t_{10}$ of the first sawtooth voltage to the third unit circuit group $B_3$, and so forth.

The second sawtooth generator circuit 112' is likewise connected via a second demultiplexor 142' to the supply terminals 144' of the even numbered ones $B_2, B_3, \ldots B_n$ of the unit circuit groups $B_1-B_n$. Under the control of the timing circuit 140, the second demultiplexor 142' delivers one cycle $t_2-t_8$ of the second sawtooth voltage $V_2$ to the second unit circuit group $B_2$, the next cycle $t_8-$ of the second sawtooth voltage to the fourth unit circuit group $B_4$, and so forth.

Alternatively, the first demultiplexor 142 may be controlled to derive only the ramp periods $t_1-t_2$, $t_5-t_8$, etc., from the first sawtooth voltage $V_1$ for delivery to the successive odd numbered unit circuit groups $B_1, B_3, \ldots B_{n-1}$. Similarly, the second demultiplexor 142' may be controlled to derive only the ramp periods $t_2-t_5$, $t_8-t_{10}$, etc., from the second sawtooth voltage $V_2$ for delivery to the successive even numbered unit circuit groups $B_2, B_4, \ldots B_n$.

We have indicated at 118 and 118' in FIG. 5 the ground terminals of the unit circuit groups $B_1-B_n$. These ground terminals are functionally equivalent to the grounded sawtooth supply terminal 18 of the FIG. 1 image sensor 10.

The odd numbered unit circuit groups $B_1, B_3, \ldots B_{n-1}$ are connected to a first CVC circuit 114 by way of individual output lines 124 and a common output line 146. The even numbered unit circuit groups $B_2, B_4, \ldots B_n$ are connected to a second CVC circuit 114' by way of individual output lines 124' and a common output line 146'.

The first CVC circuit 114 comprises an operational amplifier 126 and a feedback resistor $R_f$. The operational amplifier 126 has its inverting input connected to the common output line 146 of the odd numbered unit circuit groups $B_1, B_3, \ldots B_{n-1}$, besides being connected to the feedback resistor $R_f$. The noninverting input of the operational amplifier 126 is grounded. The second CVC circuit 114' is of like construction, comprising an operational amplifier 126' and a feedback resistor $R_f'$. The operational amplifier 126' has its inverting input connected to the common output line 146' of the even numbered unit circuit groups $B_2, B_4, \ldots B_n$, besides being connected to the feedback resistor $R_f'$. The noninverting input of the operational amplifier 126' is grounded.

The first and second CVC circuits 114 and 114' are connected via respective inverting amplifiers 128 and 128' to another multiplexor 148 and thence to an output terminal 130. Connected to the timing circuit 140, the additional multiplexor 148 is thereby controlled to combine the outputs $V_a$ and $V_b$, FIGS. 6(E) and 6(F), from the inverting amplifiers 128 and 128' into the image sensor output $V_{out}$, FIG. 6(G), at the terminal 130.

Most characteristic of this image sensor 110 are two variable bias sources 122 and 122' for the unit circuit groups $B_1-B_n$. The first variable bias source 122 is connected to the common bias terminals 120 of the odd numbered unit circuit groups $B_1, B_3, \ldots B_{n-1}$ whereas the second variable bias source 122' is connected to the common bias terminals 120' of the even numbered unit circuit groups $B_2, B_4, \ldots B_n$. The first and second variable bias source 122 and 122' generate respectively the first and second periodic bias voltages $V_{b1}$ and $V_{b2}$, FIGS. 6(C) and 6(D), under the control of the timing circuit 140.

In the image sensor 110 of the foregoing construction, the output currents $I_{out}$ will go positive during the positive ramps of the sawtooth waves of FIGS. 6(A) and 6(B). Also, as has been set forth in connection with FIG. 1, the unit circuit groups $B_1-B_n$ comprises pin diodes such as shown at $D_{a1}-D_{a3}$, $D_{b1}-D_{b3}$ and $D_{c1}-D_{c3}$. The equivalent capacitances of these pin diodes are charged during the application of the sawtooth voltage. Then, as they are discharged upon return of the sawtooth voltage to zero, the current flow through the output lines 124 and 124' will be reversed, with the consequent development of reverse voltages as indicated in FIGS. 6(E) and 6(F). Such reverse voltages are undesirable in combining the outputs from the unit circuit groups $B_1-B_n$. We have practically eliminated the adverse effects of such reverse voltages by dividing the unit circuit groups into the odd and even numbered ones.

OPERATION OF SECOND FORM

The first and second demultiplexors 142 and 142' will deliver the successive cycles of the first and second sawtooth voltages $V_1$ and $V_2$ to the successive odd numbered photoelectric unit circuit groups $B_1$, $B_3$, ... $B_{n-1}$ and to the successive even numbered photoelectric unit circuit groups $B_2$, $B_4$, ... $B_n$, respectively.

When the first unit circuit group $B_1$ is driven by the $t_1$–$t_3$ period of the first sawtooth voltage $V_1$, the output voltage $V_a$ from the first inverting amplifier 128 will first vary as during the $t_1$–$t_2$ interval in FIG. 6(E) and then go negative during the subsequent $t_2$–$t_4$ interval $T_e$. However, since the first sawtooth voltage $V_1$ has the zero period $t_3$–$t_5$, this reverse voltage will not affect the reading of the desired optical information by the next odd numbered unit circuit group $B_3$.

Of course, the reverse component of the voltage $V_a$ would present a problem if its period $T_e$ were longer than the sawtooth period $T_a$ and the zero period $t_3$–$t_5$. This problem can be overcome by making the period $T_e$ shorter than the time interval $t_2$–$t_5$ through appropriate circuit design.

The moment $t_4$ in FIG. 6 may be defined as follows: If the image sensor is designed to discriminate N intensities of optical input from one another, then the moment $t_4$ is the moment the reverse voltage becomes less than 1/N of the difference (e.g. 1000 nA) between the amplitude of each output voltage $V_a$ or $V_b$ when the optical input is of the maximum intensity and the amplitude when the optical input is cut off.

The scanning of the odd and even numbered unit circuit groups $B_1$–$B_n$ takes place alternately. When the odd numbered unit circuit groups $B_1$, $B_3$, ... $B_{n-1}$ are not being scanned by the first sawtooth voltage $V_1$, FIG. 6(A), the even numbered unit circuit groups $B_2$, $B_4$, ... $B_n$ will be scanned by the second sawtooth voltage $V_2$, FIG. 6(B). The second output voltage $V_b$, FIG. 6(F), will thus be obtained on the output side of the second inverting amplifier 128'.

The voltages $V_a$ and $V_b$ will be both directed into the multiplexor 148, thereby to be combined into the single output voltage $V_{out}$ shown in FIG. 6(G). It will be noted from FIGS. 6(E)–6(G) that the multiplexor 148 extracts only the periods $t_1$–$t_2$, $t_5$–$t_8$, etc., from the first input voltage $V_a$, and only the periods $t_2$–$t_5$, $t_8$–$t_{10}$, etc., from the second input voltage $V_b$, thereby eliminating the reverse voltage components of these input voltages. The electric signals from the photodiodes included in all the unit circuit groups $B_1$–$B_n$ can thus be accurately and quickly combined into the signal output voltage $V_{out}$ of the image sensor 110 which represents the optical information incident on all the photodiodes included in the unit circuit groups.

We wish it to be understood that the multiplexor 148 represents but one of several possible means for combining the voltages $V_a$ and $V_b$ into the image sensor output voltage $V_{out}$. Alternatively, for instance, diodes may be connected between the outputs of the operational amplifiers 126 and 126' and the ground for absorbing the reverse components of the voltages $V_a$ and $V_b$, and an adder circuit may be substituted for the multiplexor 148.

POSSIBLE MODIFICATIONS

Although we have shown and described the improved image sensor of our invention in terms of but two preferred forms thereof, additional embodiments will suggest themselves to those skilled in the art within the broad teaching hereof. The following is a brief list of possible modifications or alterations of the above disclosed embodiments which we believe all fall within the scope of our invention:

1. The blocking diodes $D_{c0}$–$D_{c3}$, which were intended to prevent the mutual interference of the photodiodes $S_0$–$S_3$, could be connected in series with the first resistors $R_{a0}$–$R_{a3}$, or between these resistors and the second resistors $R_{b1}$–$R_{b3}$.

Figure 7:
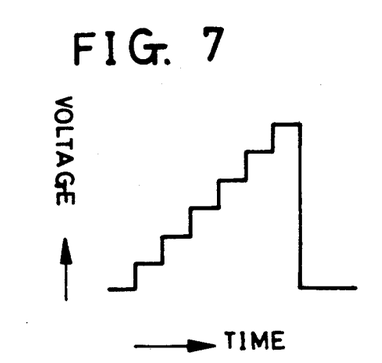
FIG. 7 is a waveform diagram of an alternative sawtooth voltage that may be employed with the image sensor of FIG. 1 or 5.
Figure 8:
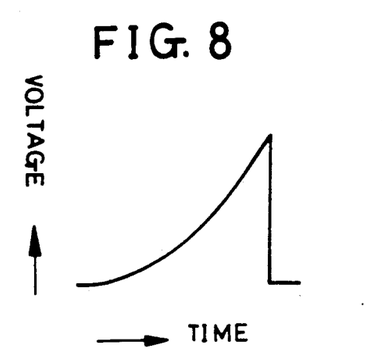
FIG. 8 is a waveform diagram of another alternative sawtooth voltage that may be employed with the image sensor of FIG. 1 or 5.

2. The ramps of the sawtooth wave could be staircased as shown in FIG. 7 or curved as shown in FIG. 8.

3. The polarities of the diodes and drive source 12 shown in FIG. 1 could be reversed, only if the polarity of the variable bias source 22 (122 and 122') were reversed, too.

4. The diodes $D_{a1}$–$D_{a3}$ and $D_{b0}$–$D_{b3}$ could be fabricated from amorphous silicon carbide, instead of from hydrogenated amorphous silicon.

5. The diodes $D_{a1}$–$D_{an}$, $D_{b0}$–$D_{bn}$ and $D_{c0}$–$D_{cn}$ might be either of the PIN, PI, IN, and schottky junction construction.

6. The second resistors $R_{b1}$, $R_{b2}$ and $R_{b2}$ could be made progressively higher in resistance in that order.

7. The CVC circuit 14, FIG. 1, and the CVC circuits 114 and 114', FIG. 5, could be made up of a current detecting resistor and an amplifier.

8. The peak value and ramp of the variable bias voltage $V_b$ are subject to change. Preferably, the bias voltage $V_b$ should be such that the value $V_r$ of the potentials $V_{p0}$–$V_{p3}$ at the circuit points $P_0$–$P_3$ at the end of the saturation period $T_c$ becomes equal to, or less than, the value $V_a$ at the beginning of the saturation period. According to the broadest aspect of our invention, however, the bias voltage source 22 (or 122 and 122') can be considered to be of utility if the potential value $V_r$ becomes less than the corresponding value $V_r'$, FIG. 2(C), according to the prior art. In any event the bias voltage $V_b$ should be such that the second diodes $D_{b0}$–$D_{b3}$ can be driven by the sawtooth voltage $V_d$.

9. The photoelectric unit circuit groups $B_1$–$B_n$ of the FIG. 5 image sensor 110 could be divided into three or more larger groups, instead of two as in the illustrated embodiment, with the provision of as many sawtooth generator circuits and associated circuits.

What we claim is:

1. An image sensor of improved response to a low intensity optical input, comprising:
   (a) drive means for generating a sawtooth voltage, the drive means having a first and a second terminal;
   (b) a first set of diodes each having a first and a second electrode and interconnected in series to provide a series circuit connected to the first terminal of the drive means, each diode having the first electrode electrically oriented toward the first terminal of the drive means in order to be forward biased by the sawtooth voltage;
   (c) a first set of resistors connected respectively to the second electrodes of the first set of diodes;
   (d) a second set of diodes each having a first and a second electrode, the first electrodes of the second set of diodes being connected respectively to the first set of resistors in order to be forward biased by the sawtooth voltage;
   (e) a second set of resistors connected respectively between the second electrodes of the first set of diodes and the second terminal of the drive means;
   (f) a current output line;

(g) a plurality of photodiodes connected respectively between the first set of resistors and the current output line and electrically so oriented with respect to the drive means as to be reverse biased by the sawtooth voltage;

(h) a plurality of blocking diodes connected respectively to the photodiodes in order to prevent their mutual interference;

(i) a current to voltage converter circuit connected between the second terminal of the drive means and the current output line; and (j) a bias source connected between the second terminal of the drive means and the second electrodes of the second set of diodes for generating a periodic bias voltage in synchronism with the sawtooth voltage, the bias voltage having a series of ramps opposite in direction of progress to the ramps of the sawtooth voltage, so that voltages for scanning the photodiodes can be restrained from increasing with an increase in the sawtooth voltage beyond their saturation points determined by the second set of diodes.

2. An image sensor of improved response to a low intensity optical input, comprising:

(a) first drive means for generating a first sawtooth voltage;

(b) second drive means for generating a second sawtooth voltage of the same frequency as the first sawtooth voltage but with a phase difference such that each ramp of the second sawtooth voltage begins at the end of one ramp of the first sawtooth voltage;

(c) a first photoelectric unit circuit group comprising:
  (1) a first set of diodes interconnected in series to provide a series circuit connected to the first drive means, each diode of the first set being so electrically oriented with respect to the first drive means as to be forward biased by the first sawtooth voltage;
  (2) a first set of resistors connected respectively to the first set of diodes;
  (3) a second set of diodes connected respectively to the first set of resistors, each diode of the second set being so electrically oriented with respect to the first drive means as to be forward biased by the first sawtooth voltage;
  (4) a second set of resistors connected respectively between the first set of diodes and the first drive means;
  (5) a current ouput line;
  (6) a plurality of photodiodes connected respectively between the first set of resistors and the current output line and electrically so oriented with respect to the first drive means as to be reverse biased by the first sawtooth voltage; and
  (7) a plurality of blocking diodes connected respectively to the photodiodes in order to prevent their mutual interference;

(d) a second photoelectric unit circuit group comprising:
  (1) a first set of diodes interconnected in series to provide a series circuit connected to the second drive means, each diode of the first set of the second photoelectric unit circuit group being so electrically oriented with respect to the second drive means as to be forward biased by the second sawtooth voltage;
  (2) a first set of resistors connected respectively to the first set of diodes of the second photoelectric unit circuit group;
  (3) a second set of diodes connected respectively to the first set of resistors of the second photoelectric unit circuit group, each diode of the second set of the second photoelectric unit circuit group being so electrically oriented with respect to the second drive means as to be forward biased by the second sawtooth voltage;
  (4) a second set of resistors connected respectively between the first set of diodes of the second photoelectric unit circuit group and the second drive means;
  (5) a current output line;
  (6) a plurality of photodiodes connected respectively between the first set of resistors of the second photoelectric unit circuit group and the current output line of the second photoelectric unit circuit group and electrically so oriented with respect to the second drive means as to be reverse biased by the second sawtooth voltage; and
  (7) a plurality of blocking diodes connected respectively to the photodiodes of the second photoelectric unit circuit group in order to prevent their mutual interference;

(e) a first current to voltage converter circuit connected between the first drive means and the current output line of the first photoelectric unit circuit group;

(f) a second current to voltage converter circuit connected between the second drive means and the current output line of the second photoelectric unit circuit group;

(g) means connected to the first and the second current to voltage converter circuits for combining outputs therefrom;

(h) a first bias source connected between the first drive means and the second set of diodes of the first photoelectric unit circuit group for generating a periodic first bias voltage in synchronism with the first sawtooth voltage, the first bias voltage having a series of ramps opposite in direction of progress to the ramps of the first sawtooth voltage, so that voltages for scanning the photodiodes of the first photoelectric unit circuit group can be restrained from increasing with an increase in the first sawtooth voltage beyond their saturation points determined by the second set of diodes of the first photoelectric unit circuit group; and (i) a second bias source connected between the second drive means and the second set of diodes of the second photoelectric unit circuit group for generating a periodic second bias voltage in synchronism with the second sawtooth voltage, the second bias voltage having a series of ramps opposite in direction of progress to the ramps of the second sawtooth voltage, so that voltages for scanning the photodiodes of the second photoelectric unit circuit group can be restrained from increasing with an increase in the second sawtooth voltage beyond their saturation points determined by the second set of diodes of the second photoelectric unit circuit group.

3. An image sensor of improved response to a low intensity optical input, comprising:

(a) first drive means for generating a first sawtooth voltage;

(b) second drive means for generating a second sawtooth voltage of the same frequencey as the first sawtooth voltage but with a phase difference such that each ramp of the second sawtooth voltage begins at the end of one ramp of the first sawtooth voltage;

(c) a plurality of first photoelectric unit circuit groups each comprising:

(1) a first set of diodes interconnected in series and each so electrically oriented with respect to the first drive means as to be forward biased by the first sawtooth voltage;

(2) a first set of resistors connected respectively to the first set of diodes;

(3) a second set of diodes connected respectively to the first set of resistors, each diode of the second set being so electrically oriented with respect to the first drive means as to be forward biased by the first sawtooth voltage;

(4) a second set of resistors connected respectively between the first set of diodes and the first drive means;

(5) a current output line;

(6) a plurality of photodiodes connected respectively between the first set of resistors and the current output line and electrically so oriented with respect to the first drive means as to be reverse biased by the first sawtooth voltage; and (7) a plurality of blocking diodes connected respectively to the photodiodes in order to prevent their mutual interference;

(d) a plurality of second photoelectric unit circuit groups each comprising:

(1) a first set of diodes interconnected in series and so electrically oriented with respect to the second drive means as to be forward biased by the second sawtooth voltage;

(2) a first set of resistors connected respectively to the first set of diodes of each second photoelectric unit circuit group;

(3) a second set of diodes connected respectively to the first set of resistors of each second photoelectric unit circuit group, each diode of the second set of each second photoelectric unit circuit group being so electrically oriented with respect to the second drive means as to be forward biased by the second sawtooth voltage;

(4) a second set of resistors connected respectively between the first set of diodes of each second photoelectric unit circuit group and the second drive means;

(5) a current output line;

(6) a plurality of photodiodes connected respectively between the first set of resistors of each second photoelectric unit circuit group and the current output line of each second photoelectric unit circuit group and electrically so oriented with respect to the second drive means as to be reverse biased by the second sawtooth voltage; and (7) a plurality of blocking diodes connected respectively to the photodiodes of each second photoelectric unit circuit group in order to prevent their mutual interference;

(e) a first delivery circuit connected between the first drive means and the first unit circuit groups for successively delivering the ramps of the first sawtooth voltage to the first photoelectric unit circuit groups in a predetermined sequence;

(f) a second delivery circuit connected between the second drive means and the second unit circuit groups for successively delivering the ramps of the second sawtooth voltage to the second photoelectric unit circuit groups in a predetermined sequence;

(g) a first current to voltage converter circuit connected between the first drive means and the current output lines of the first photoelectric unit circuit groups;

(h) a second current to voltage converter circuit connected between the second drive means and the current output lines of the second photoelectric unit circuit groups;

(i) means connected to the first and the second current to voltage converter circuits for combining outputs therefrom;

(j) a first bias source connected between the first drive means and the second sets of diodes of the first photoelectric unit circuit groups for generating a periodic first bias voltage in synchronism with the first sawtooth voltage, the first bias voltage having a series of ramps opposite in direction of progress to the ramps of the first sawtooth voltage, so that voltages for scanning the photodiodes of each first photoelectric unit circuit group can be restrained from increasing with an increase in the first sawtooth voltage beyond their saturation points determined by the second set of diodes of each first photoelectric unit circuit group; and (k) a second bias source connected between the second drive means and the second set of diodes of the second photoelectric unit circuit groups for generating a periodic second bias voltage in synchronism with the second sawtooth voltage, the second bias voltage having a series of ramps opposite in direction of progress to the ramps of the second sawtooth voltage, so that voltages for scanning the photodiodes of each second photoelectric unit circuit group can be restrained from increasing with an increase in the second sawtooth voltage beyond their saturation points determined by the second set of diodes of each second photoelectric unit circuit group.

4. The image sensor of claim 3 wherein the first and the second delivery circuits are each a demultiplexor.

5. The image sensor of claim 3 further comprising a timing circuit connected to all of the first and the second drive means, the first and the second delivery circuits, and the first and the second bias sources for timing their operations to one another.

6. An image sensor comprising:

(a) first drive means for generating a first sawtooth voltage;

(b) second drive means for generating a second sawtooth voltage of the same frequency as the first sawtooth voltage but with a phase difference such that each ramp of the second sawtooth voltage begins at the end of one ramp of the first sawtooth voltage;

(c) a plurality of first photoelectric unit circuit groups each comprising:

(1) a first set of diodes interconnected in series and each so electrically oriented with respect to the first drive means as to be forward biased by the first sawtooth voltage;
(2) a first set of resistors connected respectively to the first set of diodes;
(3) a second set of diodes connected respectively between the first set of resistors and the first drive means, each diode of the second set being so electrically oriented with respect to the first drive means as to be forward biased by the first sawtooth voltage;
(4) a second set of resistors connected respectively between the first set of diodes and the first drive means;
(5) a current output line;
(6) a plurality of photodiodes connected respectively between the first set of resistors and the current output line and electrically so oriented with respect to the first drive means as to be reverse biased by the first sawtooth voltage; and
(7) a plurality of blocking diodes connected respectively to the photodiodes in order to prevent their mutual interference;

(d) a plurality of second photoelectric unit circuit groups each comprising:
(1) a first set of diodes interconnected in series and so electrically oriented with respect to the second drive means as to be forward biased by the second sawtooth voltage;
(2) a first set of resistors connected respectively to the first set of diodes of each second photoelectric unit circuit group;
(3) a second set of diodes connected respectively between the first set of resistors of each second photoelectric unit circuit group and the second drive means, each diode of the second set of each second photoelectric unit circuit group being so electrically oriented with respect to the second drive means as to be forward biased by the second sawtooth voltage;
(4) a second set of resistors connected respectively between the first set of diodes of each second photoelectric unit circuit group and the second drive means;
(5) a current output line;
(6) a plurality of photodiodes connected respectively between the first set of resistors of each second photoelectric unit circuit group and the current output line of each second photoelectric unit circuit group and electrically so oriented with respect to the second drive means as to be reverse biased by the second sawtooth voltage; and
(7) a plurality of blocking diodes connected respectively to the photodiodes of each second photoelectric unit circuit group in order to prevent their mutual interference;

(e) a first delivery circuit connected between the first drive means and the first unit circuit groups for successively delivering the ramps of the first sawtooth voltage to the first photoelectric unit circuit groups in a predetermined sequence;
(f) a second delivery circuit connected between the second drive means and the second unit circuit groups for successively delivering the ramps of the second sawtooth voltage to the second photoelectric unit circuit groups in a predetermined sequence;
(g) a first current to voltage converter circuit connected between the first drive means and the current output lines of the first photoelectric unit circuit groups;
(h) a second current to voltage converter circuit connected between the second drive means and the current output lines of the second photoelectric unit circuit groups; and
(i) means connected to the first and the second current to voltage converter circuits for combining outputs therefrom.

7. The image sensor of claim 6 wherein the first and the second delivery circuits are each a demultiplexor.

8. The image sensor of claim 6 further comprising a timing circuit connected to all of the first and the second drive means, and the first and the second delivery circuits for timing their operations to one another.

* * * * *